US012577356B2

(12) United States Patent
Park et al.

(10) Patent No.: US 12,577,356 B2
(45) Date of Patent: Mar. 17, 2026

(54) SURFACE-TREATED INORGANIC NANO-PARTICLE AND COMPLEX FILM COMPRISING THE SAME

(71) Applicant: SAMSUNG ELECTRO-MECHANICS CO., LTD., Suwon-si (KR)

(72) Inventors: Seong Chan Park, Suwon-si (KR); Chang Hyun Yoon, Suwon-si (KR); Jung Hyun Lee, Suwon-si (KR); Eun Jung Lim, Suwon-si (KR); Young O Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 565 days.

(21) Appl. No.: 18/106,657

(22) Filed: Feb. 7, 2023

(65) Prior Publication Data

US 2024/0141118 A1 May 2, 2024

(30) Foreign Application Priority Data

Oct. 14, 2022 (KR) ........................ 10-2022-0132361

(51) Int. Cl.

| | |
|---|---|
| ***C08J 5/18*** | (2006.01) |
| ***C08K 3/22*** | (2006.01) |
| ***C08K 9/02*** | (2006.01) |
| ***C08K 9/08*** | (2006.01) |
| *B82Y 30/00* | (2011.01) |
| *B82Y 40/00* | (2011.01) |

(52) U.S. Cl.
CPC *C08J 5/18* (2013.01); *C08K 3/22* (2013.01); *C08K 9/02* (2013.01); *C08K 9/08* (2013.01); *B82Y 30/00* (2013.01); *B82Y 40/00* (2013.01); *C08J 2300/22* (2013.01); *C08K 2003/2241* (2013.01); *C08K 2201/003* (2013.01); *C08K 2201/011* (2013.01)

(58) Field of Classification Search
CPC ..... C08J 5/18; C08K 3/22; C08K 9/02; C08K 9/08
See application file for complete search history.

(56) References Cited

U.S. PATENT DOCUMENTS

2010/0297447 A1 11/2010 Tadakuma
2014/0377541 A1* 12/2014 Abu-Shanab ........ C09D 163/00 428/327

(Continued)

FOREIGN PATENT DOCUMENTS

CN 101808941 B 10/2012
CN 114930240 A 8/2022
JP 2005148272 A * 6/2005 ............... G02B 1/11

(Continued)

OTHER PUBLICATIONS

English machine translation of JP 2005-148272A. (Year: 2005).*

(Continued)

*Primary Examiner* — John E Uselding
(74) *Attorney, Agent, or Firm* — NSIP Law

(57) ABSTRACT

A surface-treated inorganic nanoparticle includes a core including titania ($TiO_2$); a shell surrounding the core, and including zirconia ($ZrO_2$); and a dispersant including a phosphate functional group, and connected to the shell.

12 Claims, 4 Drawing Sheets

100

(56) References Cited

U.S. PATENT DOCUMENTS

| | | | |
|---|---|---|---|
| 2021/0223686 | A1 | 7/2021 | Joshi et al. |
| 2021/0247658 | A1 | 8/2021 | Anseth et al. |

FOREIGN PATENT DOCUMENTS

| | | | |
|---|---|---|---|
| JP | 2009-265658 | A | 11/2009 |
| JP | 2009-298995 | A | 12/2009 |
| KR | 10-2007-0094869 | A | 9/2007 |
| KR | 10-2017-0120886 | A | 11/2017 |
| KR | 10-2022-0041274 | A | 4/2022 |
| TW | 202200503 | A | 1/2022 |

OTHER PUBLICATIONS

Taiwanese Office Action issued on Dec. 11, 2023, in counterpart Taiwanese Patent Application No. 112104603 (10 pages in English, 8 pages in Chinese).

Korean Office Action Issued on May 1, 2024, in Counterpart Korean Patent Application No. 10-2022-0132361 (8 Pages in English, 7 Pages in Korean).

* cited by examiner

SURFACE-TREATED INORGANIC NANO-PARTICLE AND COMPLEX FILM COMPRISING THE SAME

CROSS-REFERENCE TO RELATED APPLICATION(S)

This application claims the benefit under 35 USC 119(a) of priority to Korean Patent Application No. 10-2022-0132361 filed on Oct. 14, 2022 in the Korean Intellectual Property Office, the entire disclosure of which is incorporated herein by reference for all purposes.

BACKGROUND

1. Field

The present disclosure relates to a surface-treated inorganic nanoparticle and a complex film including the same.

2. Description of Related Art

The main optical properties that a camera lens material should have may be classified as a refractive index, birefringence, Abbe number, and transmittance, or the like. It is important to design a camera lens to take advantage of each property.

While the refractive index is one of the most important optical properties, as the refractive index increases, the lens may be made thinner and the resolution may be increased, making the refractive index desirable in developing a lens material.

An inorganic material such as glass or a high-refractive polymer may be used to manufacture a camera lens with such a high refractive index.

A polymer material is light, not easily broken, and has many advantages compared to inorganic materials, including being inexpensive in terms of price.

In addition, since a range of refractive indices can be adjusted according to the chemical structure of the polymer, such a polymer may be used as an optical material according to the purpose thereof.

However, there is a limit to increasing a refractive index by changing the polymer's chemical structure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a surface-treated inorganic nanoparticle includes a core including titania ($TiO_2$); a shell surrounding the core, and including zirconia ($ZrO_2$); and a dispersant including a phosphate functional group, and connected to the shell.

The inorganic nanoparticle may have a core-shell particle diameter of 5 nm to 30 nm.

The dispersant may include at least one of poly (ethylene glycol) methyl ether, poly (2-ethyl-2-oxazoline), or polydimethylsiloxane, or any combinations thereof.

A surface treatment layer may be disposed on the shell.

The surface treatment layer may include the dispersant, and a portion of the dispersant may penetrate through the surface treatment layer.

The dispersant may include a compound including a chain having a repeating unit, and a terminal group connected to an end of the chain.

The dispersant may include a structure derived from a component represented by:

[Formula 1]

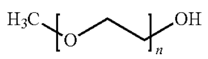

Poly(ethylene glycol) methyl ether

The dispersant may include a structure derived from a component represented by:

[Formula 2]

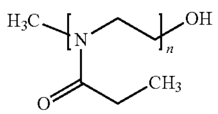

Poly(2-ethyl-2-oxazoline)

The dispersant may include a structure derived from a component represented by:

[Formula 3]

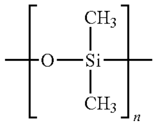

Polydimethylsiloxane

A complex film may include a polymer and the surface-treated inorganic nanoparticle.

In another general aspect, a complex film includes a polymer, and a surface-treated inorganic nanoparticle dispersed in the polymer. The inorganic nanoparticle includes a core including titania ($TiO_2$), a shell surrounding the core, and including zirconia ($ZrO_2$), and a dispersant including a phosphate functional group, and connected to the shell.

The inorganic nanoparticle may have a core-shell particle diameter of 5 nm to 30 nm.

In the inorganic nanoparticle, the dispersant may include at least one of Poly (ethylene glycol) methyl ether, Poly (2-ethyl-2-oxazoline), or Polydimethylsiloxane, or any combinations thereof.

The polymer may include polyester containing fluorene or a polycarbonate containing fluorene.

The inorganic nanoparticle may be contained in an amount of 5 to 70% by weight based on a total weight of the complex film.

Other features and aspects will be apparent from the following detailed description, the drawings, and the claims.

BRIEF DESCRIPTION OF DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
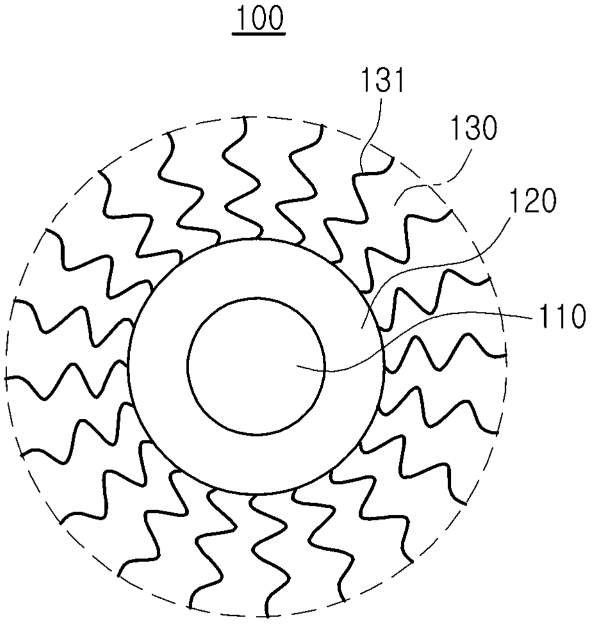
FIG. 1 schematically illustrates an example of surface-treated inorganic nanoparticles.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Optical polymer inorganic nanocomposite can overcome the limitation of a refractive index that cannot be achieved with an optical polymer alone, and has the advantage of being used as a new optical material in combination with the high processability of the optical polymer.

In general, when inorganic nanoparticles having a high refractive index are evenly dispersed in an organic polymer resin, it can greatly improve the optical material's refractive index.

There are three methods to make a composite by uniformly dispersing nanoparticles in an optical polymer, the methods including: 1) a method of inserting the particles into a molten polymer and mixing the same, 2) a method of dissolving the polymer in a solvent, dispersing the particles and removing the solvent, and 3) a method of mixing and polymerizing a monomer and the particles.

Meanwhile, $TiO_2$ is an inorganic material used in various fields, and has a significantly high refractive index (n=2.45~2.70) and is known as a chemically and physically stable material.

However, $TiO_2$ may have the disadvantage of breaking organic materials by releasing hot electrons due to high reactivity when exposed to light, making it difficult to use as an optical material.

In addition, the conventional inorganic nanoparticles are rutile crystalline high refractive index particles having an average particle diameter of 10 nm or less by coating a surface of $TiO_2$ particles with at least one of oxides selected from $ZrO_2$, $Nb_2O_5$, $SnO_2$, ZnO, $CeO_2$ and $La_2O_2$.

Dispersion using such inorganic nanoparticles is disclosed, and there is a display sheet to which this dispersion is applied. When $TiO_2$ having a high refractive index is used, a problem in that the sheet becomes cloudy due to photoactivity may occur.

Surface-Treated Inorganic Nanoparticles

A high-refractive optical polymer having various advantages is used to manufacture a camera lens having a high refractive index, but there is a limit to increasing the refractive index by changing the chemical structure of the polymer, so that it is desirable to increase the refractive index by incorporating high refractive nanoparticles into a polymer matrix.

In addition, in order to efficiently increase a refractive index of a complex film, the inorganic nanoparticles must be evenly dispersed in a polymer matrix.

The complex film used for optics can be prepared by mixing nanoparticles with thermosetting or thermoplastic polymers.

The thermosetting polymer complex film may be prepared by mixing an acrylic liquid monomer and inorganic nanoparticles and then polymerizing the same.

In this case, the surface of the inorganic nanoparticles may react with acryl and be modified into molecules with a structure similar to that of acryl, thereby increasing the miscibility of two different materials.

In addition, to incorporate inorganic nanoparticles using a thermoplastic polymer, a method of incorporating a polymer in a molten state and inorganic nanoparticles by applying heat or a method of dissolving both the polymer and inorganic nanoparticles in a solvent and then removing the solvent can be used.

Even in this case, it may be desirable to modify the surface of the inorganic nanoparticles with a dispersant to increase the interface's affinity between two dissimilar materials and to disperse the inorganic nanoparticles in the solvent evenly.

An optical thermoplastic polymer, cyclic olefin, polyester, polycarbonate, or the like may be used. Thereamong, polyester and polycarbonate containing a large number of aromatic rings in a high volume ratio may be used as a high-refractive thermoplastic polymer.

Among the aromatic rings, fluorene does not cause birefringence due to structural characteristics thereof, so it is advantageous to use as an optical lens.

Therefore, in order to increase the affinity of the interface between the thermoplastic polymer having a fluorene group and inorganic nanoparticles, for example, zirconia inorganic nanoparticles having a hydrophilic surface, it may be desirable to design a chemical structure of a dispersant suitable for this structure.

From this point of view, the surface-treated inorganic nanoparticles 100, according to an example, have high-refractive properties. As exemplified in FIG. 1, the surface-treated inorganic nanoparticles 100 include a core 110, a shell 120, and a dispersant 131.

In this case, the core 110 may include titania ($TiO_2$).

In addition, the diameter of the core 110 may be 2 nm or less. When the diameter of the core 110 exceeds 2 nm, the size of the core-shell becomes excessively large based on a Rayleigh scattering equation, thereby causing a problem in that the film becomes opaque when manufacturing the complex film.

The shell 120 may surround the core 110, and may include zirconia ($ZrO_2$).

In addition, the thickness of the shell 120 may be 2 to 3 nm. When the thickness of the shell 120 is less than 2 nm, it becomes the same thickness as the shell or has a smaller size, so that a core-shell structure in which a shell is thicker than a core may not be formed, and when the thickness thereof exceeds 3 nm, a problem in that the film becomes opaque when manufacturing a complex film may occur.

The dispersant 131 is connected to a surface of the shell 120 by covalent bonding and serves to improve aggregation of inorganic nanoparticles with each other, and may include a phosphate functional group to enable bonding with $ZrO_2$ of the shell 120.

The dispersant 131 may be connected to the surface of the shell 120 by a covalent bond or a hydrogen bond.

More specifically, a surface treatment layer 130 may be disposed on the shell 120 of the inorganic nanoparticles 100, and the surface treatment layer 130 may include a dispersant 131. In this case, a portion of the dispersant 131 may penetrate through the surface treatment layer 120.

As described above, when the inorganic nanoparticles 100 are modified into a structure having the surface treatment layer 130 using a plurality of dispersants 131 to obtain surface-treated inorganic nanoparticles 100 and then dispersing the same in a polymer, it is possible to suppress aggregation of nanoparticles and improve mixing properties with the polymer at the same time.

The dispersant 131 may include a compound with a chain having a repeating unit and a terminal group connected to an end of the chain.

The repeating unit of the chain may include an aliphatic chain, and may also include an ether group (—O—) or an amide group (—N(—C(=O)—R)—), connected to the aliphatic chain.

The terminal group may include a functional group capable of chemical bonding, for example, covalent bonding, with the inorganic nanoparticles 100.

For example, a chain of the compound included in the dispersant 131 may include polyethylene or polyoxazoline.

The terminal group may include a silane structure, a phosphate structure, or a carboxyl structure, but an embodiment thereof is not limited thereto.

FT-IR (Ge Crystal ATR accessory) of Thermo Fisher's iN 10 model can be used to analyze a structure and functional group of the compound included in the dispersant 131, and whether or not the terminal group is synthesized may be confirmed by NMR of JEOL's JNM-ECX500 II model.

For example, the compound included in the dispersant 131 may include poly(ethylene glycol)methyl ether or PDMS (Poly(dimethylsiloxane)) as a chain having a repeating unit, and a phosphate structure as a terminal group.

For example, the dispersant 131 may include a structure derived from a compound represented by the following Chemical Formula 1, in this case, the surface-treated inorganic nanoparticles may have a form in which poly(ethylene glycol) methyl ether is connected to the inorganic nanoparticles, respectively, through a phosphate structure after surface treatment, but an embodiment of the present disclosure is not limited thereto.

Whether or not the phosphate structure is synthesized can be confirmed, for example, by P31 NMR.

Here, n may be an integer of 10 to 150. In this case, it may have a molecular weight range in relation to a matrix polymer of the complex film, which will be described later. Still, an embodiment of the present disclosure is not limited thereto.

[Formula 1]

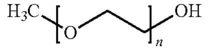

Poly(ethylene glycol) methyl ether

As another example, a compound in the dispersant 131 may include poly(2-ethyl-2-oxazoline) as a chain with a repeating unit and a phosphate structure as a terminal group.

For example, the dispersing agent 131 may include a structure derived from a compound represented by the following Chemical Formula 2, but an embodiment of the present disclosure is not limited thereto.

Here, n may be an integer from 5 to 100, but an embodiment of the present disclosure is not limited thereto.

[Formula 2]

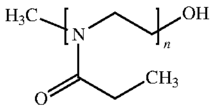

Poly(2-ethyl-2-oxazoline)

As another example, a compound included in the dispersant 131 may include polydimethylsiloxane as a chain having a repeating unit, and may include a phosphate structure as a terminal group.

For example, the dispersant 131 may include a structure derived from a compound represented by the following Formula 3, but an embodiment of present disclosure is not limited thereto.

[Formula 3]

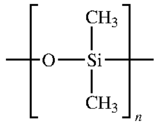

Polydimethylsiloxane

Meanwhile, in the present disclosure, for convenience of description, the dispersant may be described without distinguishing between before and after covalent bonding with inorganic nanoparticles.

This is because a portion of the dispersants may remain hydrogen bonds without covalent bonding with inorganic nanoparticles.

In this case, the structure of the terminal group of the dispersant before and after covalent bonding with the inorganic nanoparticles can be understood as a structure obvious to those skilled in the art through the main structure of the terminal group described below.

For example, the phosphate structure may be a structure derived from phosphoric acid prior to chemical bonding with inorganic nanoparticles, such as covalent bonding.

The aliphatic chain may be a saturated hydrocarbon chain. The saturated hydrocarbon chain may be in a straight-chain or ground form.

The aliphatic chain may be a $C_2$~$C_6$ saturated hydrocarbon chain, for example —($CH_2$—$CH_2$)—, —($CH_2$—$CH_2$—$CH_2$)—, —$CH_2$—$CH_2$—$CH_2$—$CH_2$)—, —($CH_2$—$CH_2$—$CH_2$—$CH_2$—$CH_2$)—, —($CH_2$—$CH_2$—$CH_2$—$CH_2$—$CH_2$—$CH_2$)—, or the like, and the aliphatic chain may be a $C_2$~$C_4$ saturated hydrocarbon chain, for example, —($CH_2$—$CH_2$)—, —($CH_2$—$CH_2$—$CH_2$)—, —($CH_2$—$CH_2$—$CH_2$—$CH_2$)—)—, or the like, but na embodiment of the present disclosure is not limited thereto.

R of an amide group (—N(—C(═O)—R)—) is a substituent, may be a $C_1$~$C_{10}$ alkyl group, for example, a methyl group, an ethyl group, a propyl group, an isopropyl group, a butyl group, an isobutyl group, a tert-butyl group, a sec-butyl group, a 1-methyl-butyl group, a 1-ethyl-butyl group, a pentyl group, an isopentyl group, a neopentyl group, a tert-pentyl group, a hexyl group, a 1-methylpentyl group, a 2-methylpentyl group, a 4-methyl-2-pentyl group, a 3,3-dimethylbutyl group, 2-ethylbutyl group, a heptyl group, a 1-methylhexyl group, an octyl group, a nonyl group, a decyl group, or the like, a $C_1$~$C_4$ alkyl group such as a methyl group, an ethyl group, a propyl group, an isopropyl group, a butyl group, an isobutyl group, a tert-butyl group, a sec-butyl group, or the like, but an embodiment thereof is not limited thereto.

The core and shell may be synthesized using a sol-gel method, and the dispersant disposed on an outermost surface may be composed of molecules with phosphoric acid as an anchor, and may be formed by additional surface treatment of the shell.

In this case, a synthesis result of $TiO_2$ and $ZrO_2$ can be confirmed through EDS mapping analysis, and whether the dispersant (phosphate functional group) is synthesized can be confirmed by P31 NMR.

Since a particle diameter of a core-shell structure in the core-shell synthesis using $TiO_2$ and $ZrO_2$ should be smaller than a minimum wavelength of light to reduce light scattering, it should be prepared with a uniform diameter of 30 nm or less.

In addition, the particle diameter of such a core-shell structure may be 5 to 30 nm, or 10 to 20 nm, so as to maintain transparency when a composite with a fluorene polymer, which will be described later, is formed.

Figure 2A:
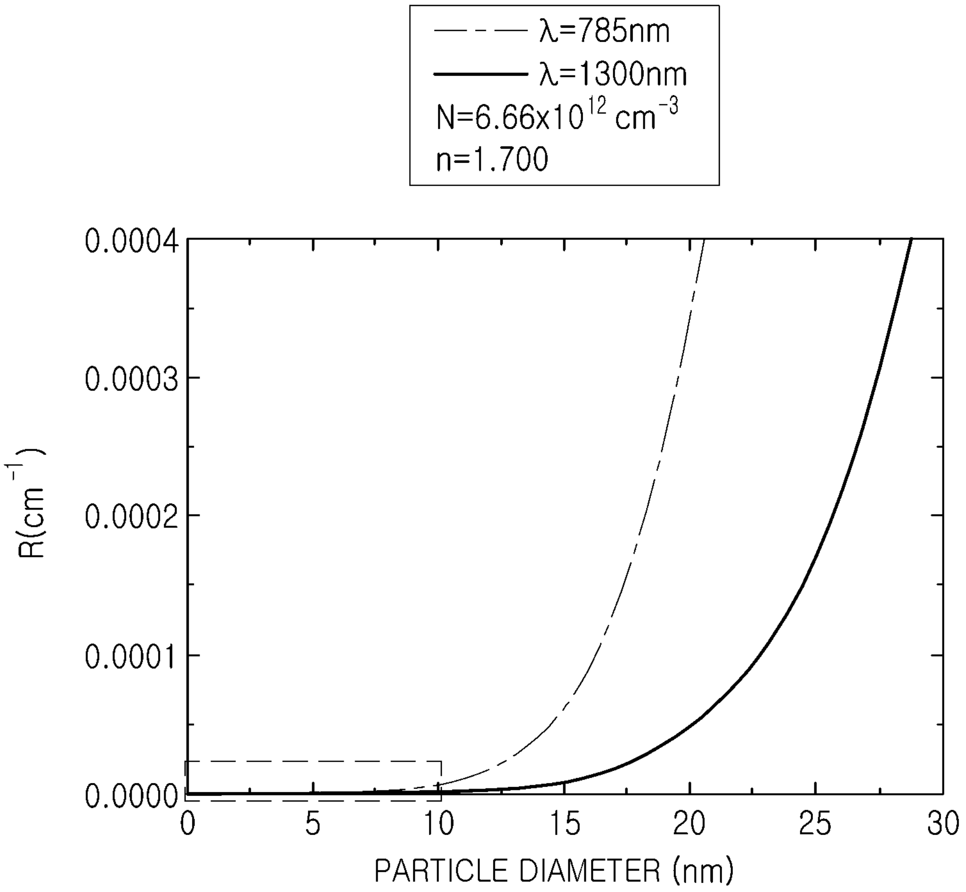
FIGS. 2A and 2B are graphs illustrating a relationship between a core-shell particle diameter of inorganic nanoparticles and a Rayleigh scattering constant.
Figure 2B:
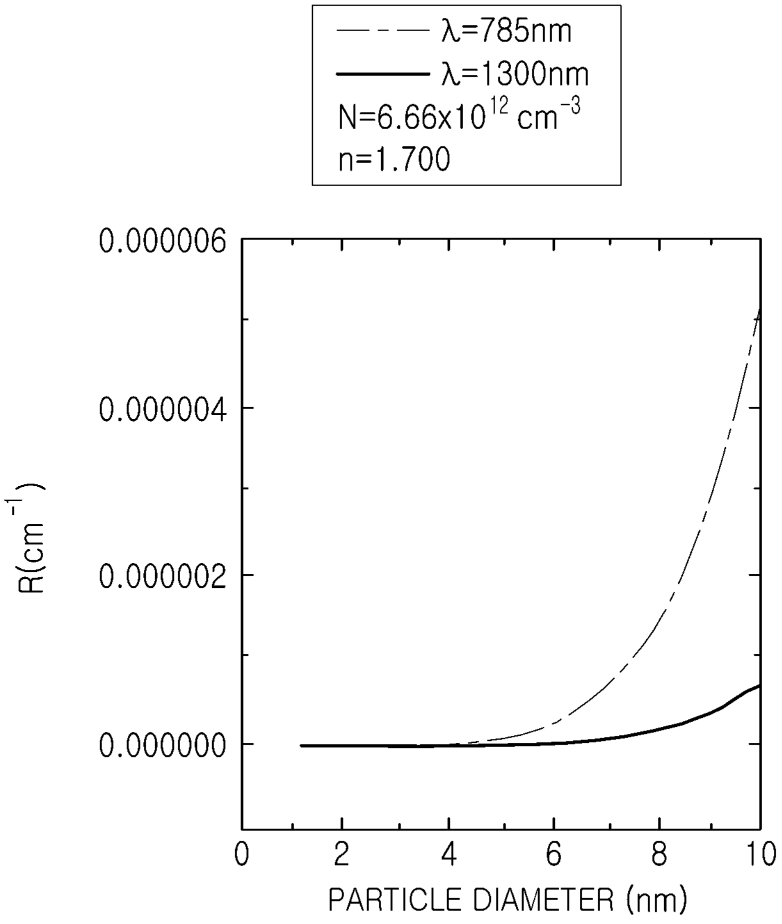

As can be seen in Equation 1 below and FIGS. 2A and 2B, when the particle diameter of the core-shell exceeds 30 nm, intensity of light transmitted by Reyleigh scattering decreases, so that a problem in which a complex film becomes opaque when generating a film may occur.

When the particle diameter of the core-shell is less than 5 nm, it may be difficult to control agglomeration.

As shown in Equation 1 below, Rayleigh scattering is proportional to the size and number of particles, and inversely proportional to the distance between particles.

$$R = \frac{2\pi^5 N d^6}{3\lambda^4}\left(\frac{n^2-1}{n^2+2}\right)^2 \quad \text{[Equation 1]}$$

Complex Film

According to an example, a complex film may include a polymer and the above-described surface-treated inorganic nanoparticles dispersed in the polymer.

According to an example, the complex film may be manufactured by complexing a polymer and the above-described surface-treated inorganic nanoparticles.

The polymer may be a thermoplastic polymer containing fluorene.

Specifically, the polymer may be polyester having a fluorene group, polycarbonate having a fluorene group, or the like, but an embodiment thereof is not limited thereto. Since inorganic nanoparticles are relatively hydrophilic, the inorganic nanoparticles can be more easily bonded to such thermoplastic polymers, such as polyester, polycarbonate, and the like, by hydrogen bonding.

This complex film can secure light stability while maintaining optical properties such as a high refractive index, or the like, so the complex film may used as a material for lens materials such as mobile phones, various electronic devices, electric cameras, and the like, and as materials for AR glass and metal lenses for high refractive index.

<Measurement of Refractive Index of Complex Film>

Hereinafter, a change in the refractive index according to the content of inorganic nanoparticles in a core-shell in a complex film is confirmed.

According to an embodiment, a sol is prepared using $TiO_2$ having a refractive index of 2.6 and $ZrO_2$ having a refractive index of 2.1, and a primary film is prepared by a film casting method in which an optical polymer (polyester series) having a refractive index of 1.68 dissolved in a solvent is mixed with the sol, and dispersed and dried. The primary film is dried and then thermocompressed to manufacture a complex film of 1.72 or more high-transparent polymer nanocomposite material. In this case, the solvent may be $ChCl_3$, THF, mc, or the like.

As shown in Table 1, the content of inorganic nanoparticles is possible from 100 wt % to 1 wt % to 90 wt % of the complex film, but 5 to 70 wt % is appropriate in order to increase the refractive index and facilitate thermoforming.

When the content of inorganic nanoparticles is less than 5% by weight, it may be difficult to have characteristics as a high-refractive lens because an increase in refractive index is low compared to optical polymer alone, and when the content of inorganic nanoparticles exceeds 70% by weight, a problem in which it is difficult to secure transparency may occur.

TABLE 1

Change in the refractive index according to the content of inorganic nanoparticles

| | Content of nanoparticles (wt %) | | | | | | | |
|---|---|---|---|---|---|---|---|---|
| | 0 | 0.1 | 5 | 15 | 25 | 35 | 50 | 70 |
| Refractive index | 1.681 | 1.680 | 1.686 | 1.701 | 1.718 | 1.740 | 1.781 | 1.873 |

<Measurement of transmittance haze of complex film>

Transmittance and haze of a complex film according to the content of inorganic nanoparticles were measured.

Figure 3:
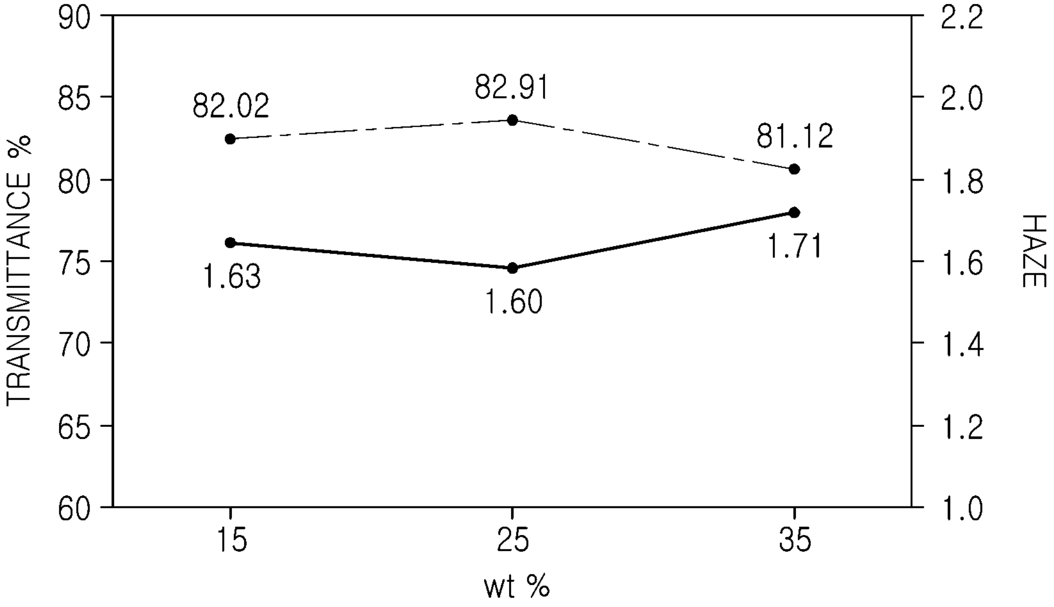
FIG. 3 is a graph illustrating transmittance and haze according to the content of inorganic nanoparticles in a complex film prepared by dispersing inorganic nanoparticles.

Referring to Table 2 and FIG. 3, the transmittance was measured at an average level of 82%, and Haze was measured at a level of 1.65.

When a z content of inorganic nanoparticles reaches 35 wt %, the transmittance decreases slightly and the haze increases. As the content thereof increases, a concentration and ratio control technology of the dispersant (shell on an outermost portion) is desirable to control the aggregation of inorganic nanoparticles.

TABLE 2

Transmittance and Haze according to content of inorganic nanoparticles

| | Content of nanoparticles (wt %) | | |
|---|---|---|---|
| | 15 | 25 | 35 |
| Transmittance (%) | 82.02285 | 82.91126 | 81.12137 |
| Haze | 1.625358 | 1.59865 | 1.710861 |

<Measurement of Band Gap of Complex Film>

In order to understand an effect of the inorganic nanoparticle structure of the core-shell structure of the present disclosure on a $TiO_2$ bandgap, it was confirmed through UV-vis diffuse reflectance spectra measurement.

Figure 4:
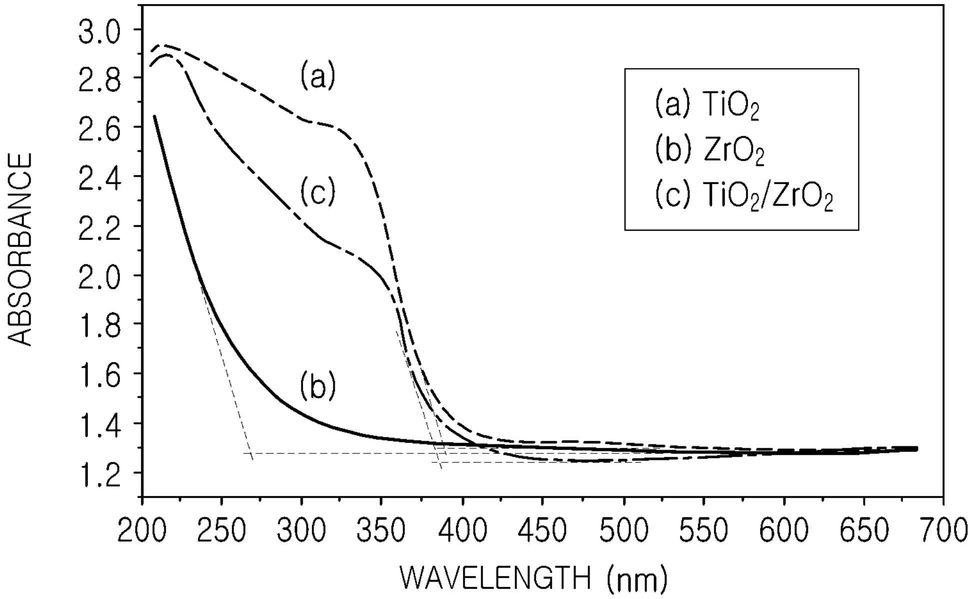
FIG. 4 is a graph illustrating a band gap of the core-shell structure of the present disclosure compared to a reference.

Referring to FIG. 4, a single $TiO_2$ bandgap is low as 3.13, which is highly responsive to light, but when a core-shell structure is formed with $ZrO_2$ with a band gap of 4.68, the band gap rises to 3.22, which is advantageous in terms of light stability.

The present disclosure relates to the composition of nanoparticles in a method of making a high refractive nanocomposite by uniformly distributing inorganic nanoparticles in a polyester and a polycarbonate optical polymer containing fluorene, and this is a method to improve a refractive index and improve light stability by creating a core-shell structure with TiO2 as a core, which has a fairly high refractive index but poor light stability, and $ZrO_2$, which has a lower refractive index than TiO2 but has low light reactivity, as a shell.

In order to further improve the aggregation of inorganic nanoparticles, a dispersant containing a ligand on an outermost layer was synthesized to create a triple-structured core-shell structure.

The composite, including the same, has an effect that it can be applied as a high refractive optical functional material.

For example, it can be prepared by applying a composition containing the above-described surface-treated inorganic nanoparticles to a polymer, then drying a solvent, and thermocompression bonding.

Alternatively, it may be prepared by adding a polymer to the composition containing the above-described surface-treated inorganic nanoparticles, then drying the solvent, and thermocompression bonding.

After thermocompression bonding, the complex film may be in a thick film state.

The polymer and the surface-treated inorganic nanoparticles may be bonded to each other by hydrogen bonding, or the like.

Meanwhile, the polymer may be used as a material for an optical lens for a camera module, and thus may be a polymer having a high refractive index.

For example, it may be a thermoplastic polymer having a fluorene group, specifically, polyester having a fluorene group, polycarbonate having a fluorene group, and the like, but an embodiment thereof is not limited thereto.

Inorganic nanoparticles, for example, zirconia nanoparticles, are relatively hydrophilic and may be more easily bonded to thermoplastic polymers, such as polyester, polycarbonate, or the like, by hydrogen bonding.

Meanwhile, the complex film may be manufactured as a thick film type having a thickness of approximately 1 mm, or may be manufactured as an aspherical lens type, but the present disclosure is not limited thereto.

Meanwhile, the content of the present disclosure is not limited to the optical lens for the camera module, and the content may be applied to other optical functional materials, for example, lenses of AR glass, meta lenses, and the like.

Experimental Example

According to the present disclosure, the surface-treated inorganic nanoparticles may be uniformly distributed in an optical polymer, including fluorene.

A multi-surface treatment structure for suppressing aggregation of zirconia nanoparticles and improving mixing properties with a polymer, such as a double surface treatment structure, is introduced, so that a more excellent effect may be obtained. Therefore, for example, functionalization on a surface of a zirconia nanosol prepared using a zirconium precursor, and complexing the same with a high refractive polymer, can be applied to electrical, electronic, and optical functional materials.

As set forth above, according to the present disclosure, by composing $TiO_2$ as a core and $ZrO_2$, a low-reactive oxide, as a shell, in a structure that can maintain the advantage of high refractive index, and by synthesizing a dispersant to increase the dispersibility of nanoparticles on a surface thereof, inorganic nanoparticles having a triple structure may be provided.

In addition, when the surface-treated inorganic nanoparticles are dispersed in the optical polymer, it is possible to provide a complex film having an excellent high refractive index that can be used, for example, for an optical lens of a camera module for a mobile phone.

As used herein, the terms "side portion," "side surface," and the like, are used to refer to a direction toward a first or second direction or a surface on said direction. The terms "upper side," "upper portion," "upper surface," and the like, are used to refer to a direction toward a third direction or a surface on said direction, while the terms "lower side," "lower portion," "lower surface," and the like, are used to refer to a direction opposing the direction toward the third direction or a surface on said direction. In addition, said spatially relative terms have been used as a concept including a case in which a target component is positioned in a corresponding direction, but does not directly contact a reference component, as well as a case in which the target component directly contacts the reference component in the corresponding direction. However, the terms may be defined as above for ease of description, and the scope of right of the embodiments is not particularly limited to the above terms.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A surface-treated inorganic nanoparticle having a core-shell structure, comprising:

a core including titania ($TiO_2$);

a shell surrounding the core, and including zirconia ($ZrO_2$); and a dispersant including a phosphate functional group, and connected to the shell, wherein the dispersant comprises a compound including a polymeric chain having a repeating unit, and a terminal group connected to an end of the polymeric chain, wherein the polymeric chain includes at least one of poly (ethylene glycol) methyl ether poly (2-ethyl-2-oxazoline), or polydimethylsiloxane, or any combinations thereof, and wherein the terminal group includes the phosphate functional group.

2. The surface-treated inorganic nanoparticle of claim 1, wherein a particle diameter of the core-shell structure is 5 nm to 30 nm.

3. The surface-treated inorganic nanoparticle of claim 1, wherein a surface treatment layer is disposed on the shell.

4. The surface-treated inorganic nanoparticle of claim 3, wherein the surface treatment layer comprises the dispersant, and a portion of the dispersant penetrates through the surface treatment layer.

5. The surface-treated inorganic nanoparticle of claim 1, wherein the dispersant comprises a structure represented by:

[Formula 1]

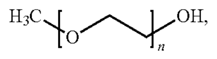

Poly(ethylene glycol) methyl ether wherein n is integer from 10 to 150.

6. The surface-treated inorganic nanoparticle of claim 1, wherein the dispersant comprises a structure represented by:

[Formula 2]

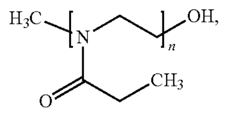

Poly(2-ethyl-2-oxazoline)

wherein n is integer from 5 to 100.

7. The surface-treated inorganic nanoparticle of claim 1, wherein the dispersant comprises a structure represented by:

[Formula 3]

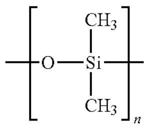

Polydimethylsiloxane, wherein n is integer from 135 to 1351.

8. A complex film, comprising a polymer and the surface-treated inorganic nanoparticle of claim 1.

9. A complex film, comprising:

a polymer; and a surface-treated inorganic nanoparticle having a core-shell structure dispersed in the polymer, wherein the surface-treated inorganic nanoparticle includes a core including titania ($TiO_2$), a shell surrounding the core, and including zirconia ($ZrO_2$), and a dispersant including a phosphate functional group, and connected to the shell, and wherein the polymer comprises a polyester containing fluorene or a polycarbonate containing fluorene.

10. The complex film of claim 9, wherein the inorganic nanoparticle has a core-shell particle diameter of 5 nm to 30 nm.

11. The complex film of claim 9, wherein the dispersant comprises a compound including a polymeric chain having a repeating unit, and a terminal group connected to an end of the polymeric chain, wherein the polymeric chain includes at least one of poly (ethylene glycol) methyl ether, poly (2-ethyl-2-oxazoline), or polydimethylsiloxane, or any combinations thereof, and wherein the terminal group includes the phosphate functional group.

12. The complex film of claim 9, wherein the surface-treated inorganic nanoparticle is contained in an amount of 5 to 70% by weight based on a total weight of the complex film.

* * * * *